(12) United States Patent  
Allen

(10) Patent No.: US 9,104,707 B1  
(45) Date of Patent: Aug. 11, 2015

(54) ITERATIVE GENERATION OF PARTIAL COLUMN SCHEMA

(71) Applicant: Amazon Technologies, Inc., Reno, NV (US)

(72) Inventor: Nicholas Alexander Allen, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 309 days.

(21) Appl. No.: 13/829,375

(22) Filed: Mar. 14, 2013

(51) Int. Cl.  
*G06F 17/30* (2006.01)

(52) U.S. Cl.  
CPC ................ *G06F 17/30292* (2013.01)

(58) Field of Classification Search  
CPC ............ G06F 17/30569; G06F 17/30286; G06F 17/30595; G06F 17/30292  
USPC ............................ 707/803, 809, 802  
See application file for complete search history.

(56) References Cited

U.S. PATENT DOCUMENTS

| | | | |
|---|---|---|---|
| 8,639,727 B2* | 1/2014 | Hui et al. | 707/802 |
| 8,799,299 B2* | 8/2014 | Carroll et al. | 707/756 |
| 2013/0290338 A1* | 10/2013 | Lee et al. | 707/739 |

* cited by examiner

*Primary Examiner* — Albert Phillips, III  
*Assistant Examiner* — Loc Tran  
(74) *Attorney, Agent, or Firm* — Baler & Hostetler, LLP

(57) ABSTRACT

Systems and methods for iteratively generating a partial column schema indicative of semantic relationships in a corpus of key-value data are disclosed. A set of textual values is extracted from a pre-existing corpus of key-value data and potential column names are generated. Value reassignment and potential column pruning proceeds based on semantic fit quality, potential column utilization and random factors influenced by a decreasing system temperature.

28 Claims, 6 Drawing Sheets

ITERATIVE GENERATION OF PARTIAL COLUMN SCHEMA

BACKGROUND

A broad class of database management systems may be characterized by their lack of strict conformance to the relational database model. Such systems typically do not support structured query language ("SQL") queries. They also tend to employ a wide range of alternative structures for storing data, eschewing the strictly-enforced table and column format employed by traditional relational database management systems. For example, some non-SQL based ("NoSQL") systems employ key value pairings, in which a key value is associated with one or more associated data values. In general, no particular order, type or meaning is imposed on the data values associated with any given key.

Although the database management system does not impose a strict schema, various operations could be performed on the data if its ontology could be understood or approximated to a reasonable degree of accuracy. Various secondary indexes could, for example, be constructed over semantically similar data. To employ such techniques, it would be advantageous to have automated methods of computing the ontology of data maintained by the database management system. Ideally, such methods would be computationally efficient and reasonably accurate, even for database management systems that maintain a large corpus of preexisting data.

DETAILED DESCRIPTION

A database management system may support storage and retrieval of data by associating key values with sets of one or more related values. Data may be stored by providing the unique key and the set of values to the database management system, and retrieved by providing the key. For convenience, a given key and its set of related values may be described as a row or an item, and the individual values referred to as columns. However, the database management system need not enforce any particular structure beyond the key-values pairing. The set of values associated with each key may have different meaning, ordering and number. In other words, any given row may have a variable number of columns, and the columns in each row may have different semantic meaning than similarly positioned columns in other rows.

Despite the lack of enforced structure, there may still be significant commonality in the data stored by such systems. In particular, values contained in the key-value data may have semantic similarity. As one example, the database management system may contain a store of key-value data pertaining to a particular topic, such as food. At a more granular level of classification, some of the data may pertain to vegetables, while other data pertains to types of meat. However, because the database management system does not enforce a particular schema, there is no guarantee that vegetable-related data will be in the same position in each column, or even that it will be present in each column at all. Accordingly, it can be difficult for a computing process to ascertain and represent these semantic relationships contained in the data.

Various operations and tools may benefit from a representation of the semantic relationships contained within the key-value data. Examples include data mining, knowledge discovery, indexing and other various forms of optimization. It would therefore be beneficial to have systems and methods capable of discerning and representing the semantic relationships contained in a corpus of pre-existing data. In an embodiment, a structure recording assignments or associations between potential column names and semantically similar data may be described as a partial column schema. It is considered partial because not all values are necessarily assigned to potential column names, and not all potential column names are necessarily assigned to any values. Nevertheless, a process of iterative refinement of a partial column schema may produce a reasonably accurate grouping of semantically related data.

Figure 1:
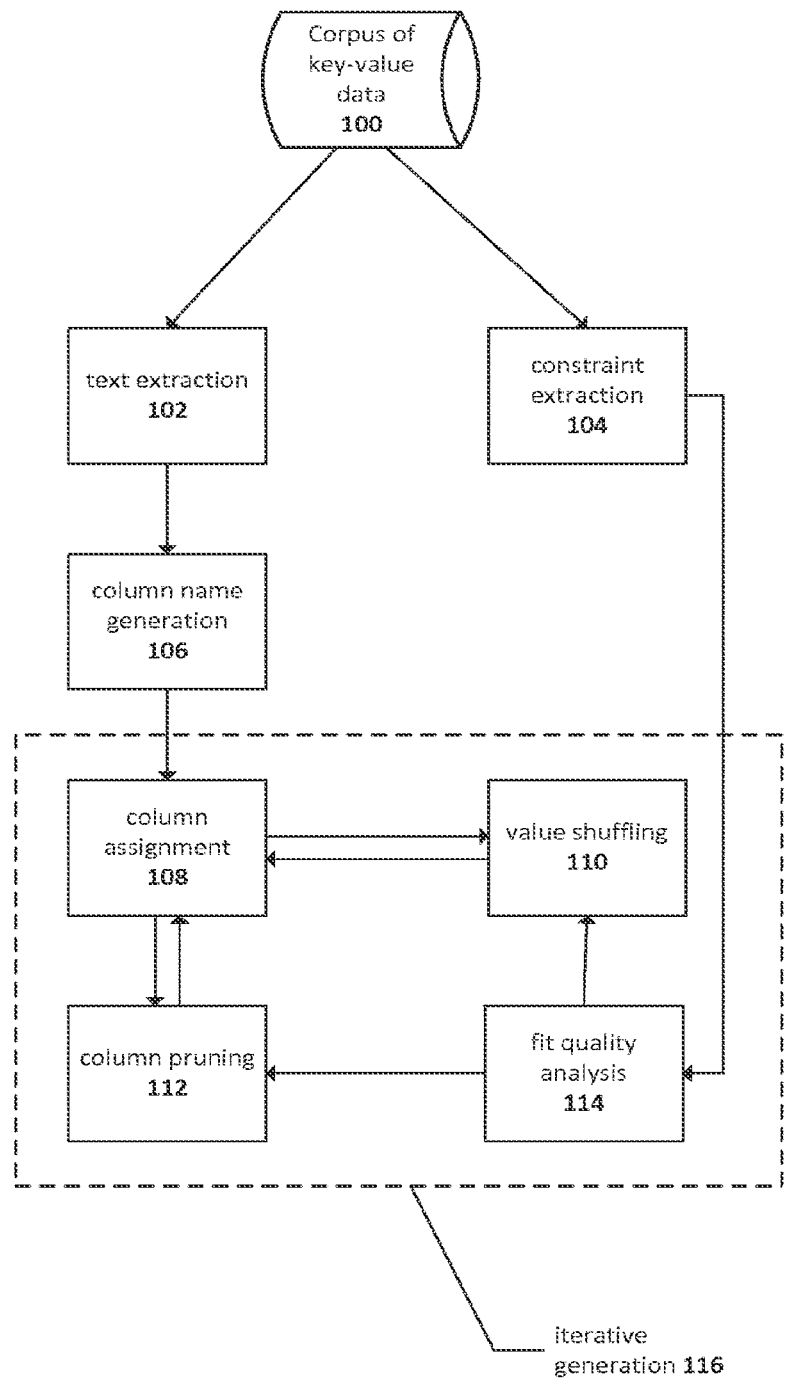
FIG. 1 depicts an iterative process of generating a partial column schema indicative of semantically related data.

FIG. 1 depicts a process for the iterative generation of a partial column schema. In the context of the present disclosure, a partial column schema is a set of assignments or associations between values stored in a database management system and potential column names generated to represent semantic similarity between values assigned to or associated with the potential column name. Accordingly, FIG. 1 depicts steps for creating and refining these associations. Those of ordinary skill in the art will appreciate that, although FIG. 1 is depicted as involving a sequence, some of the depicted operations may be altered, omitted or performed in an order other than the one depicted. Furthermore, various aspects of the depicted operations may be distributed across multiple threads, processors or computing systems, and performed in parallel.

Corpus of key-value data 100 represents a collection of key-value data, typically stored within a database management system. A corpus of key-value data may be described as a set of items, in which each item has a key and one or more values associated with the key. Although the systems and methods described herein generally refer to key-value data in the context of non-relational database systems, they are also applicable to data stored using other means, including relational databases, data warehouses, columnar databases, b-trees or structured or semi-structured textual formats such as extensible markup language ("XML"). As one example, a single relational database column might contain data having a low degree of semantic similarity. Various embodiments of the present disclosure could be applied to divide the data into two or more columns of data having a higher degree of semantic similarity than the original single column.

Text extraction 102 involves an analysis of the text contained in the corpus of key-value data. The operation may, for example, compile lists or other data structures containing a subset of values from the key-value data. Various operations may be performed during extraction, including parsing, conversion of non-textual data such as integers or enumerated types to textual data or other transformations. Various forms of canonicalization, stemming or lemmatization might also be performed. For example, the textual values might be extracted and consistently pluralized. One benefit of these techniques is that they reduce the number of extracted values that need to be retained, and they are also useful for analyzing semantic equality and similarity.

Constraint extraction 104 involves a determination of factors constraining the eventual solution. For example, as a general principal, values sharing a common key (i.e. in the same row) may have a lesser probability of being semantically related. Values of different types—such as integers compared to plain text—may have a high probability of being semantically unrelated. These factors may be applied in a manner that influences but not necessarily limits the assignment of values to generated column names. Accordingly, constraints may be assigned a strength metric reflecting a probability of semantic similarity. One non-limiting example of a constraint might involve a "customer id" key value paired with "chicken" and "cheddar" values. Although both of these values are food, they may be considered to be somewhat less likely to be properly grouped together based on the fact that they were assigned a common key.

Constraints may be assigned a strength based on repetition of placement with a common key. A constraint for two values that share many common keys may be assigned a high strength, while a constraint for values that share a small number of common keys may be assigned a relatively low strength. Conversely, if two values predominately appear on different rows, the associated constraint may be assigned a low strength. In some embodiments, a constraint may be eliminated if its strength is below a threshold value. One non-limiting example of constraint strength readjustment might involve the previous "chicken" and "cheddar" values. If these values appear repeatedly in the corpus of key-value data associated with common "customer id" values, they are somewhat less likely to be properly grouped together than if the pattern only appeared once in the corpus of key-value data.

Column name generation 106 involves generating a set of potential column names based on the extracted values. Various operations may be performed to produce one or more potential column names based on a single extracted value. Examples include stemming, lemmatization or other means of reducing the value to morphological roots. Enumerations of synonyms and enumerations of antonyms might also be used. Furthermore, potential column names could be generated based on grouping or collective nouns associated with a value. For example, referring to key-value data 100, the collective noun "meat" might be generated as a potential column name responsive to the "ground beef" value.

Various computer-implemented dictionaries might be employed to perform the operations and analysis described above. A dictionary could be employed prior to stemming or related operations, or once the value has been reduced to a morphological root. In various embodiments, specialized technical dictionaries may be employed, chosen for relevance to the corpus of key-value data. Dictionaries may be implemented using a wide variety of data structures, files or database management systems. In one embodiment, a dictionary comprises a database management system in which stemmed or canonicalized values are used as keys, and the associated values comprise potential column names based on the stemmed or canonicalized value. In other embodiments, a dictionary may be implemented as an ontology graph structure.

Ontological graphs may be employed to represent knowledge as a set of concepts and interrelationships between concepts. An ontology may refer to a set of concepts within a particular domain, and may include representations of entities, ideas, events and so forth, which may be referred to more generally as concepts. Interrelationships between concepts may be expressed through the use of a graph or other structure. In an embodiment, various means such as links or pointers may be employed to represent the graph's edges. In a directed graph, an ontology may be represented by the set of concepts and a number of edges having directionality. The graph may be traversed by following edges along the indicated direction. Furthermore, it may be advantageous to employ a directed acyclic graph, in which traversing the graph along the edges does not result in repeatedly cycling through the same node or set of nodes. Various properties may be associated with the nodes in the graph and with the edges. In an embodiment, the edges of the graph may be weighted with an indication of the strength of interrelationship between two concepts. A traversal of the graph may involve selecting an edge to follow based on the relative weights, or the sum of weights along a given path.

Figure 2:
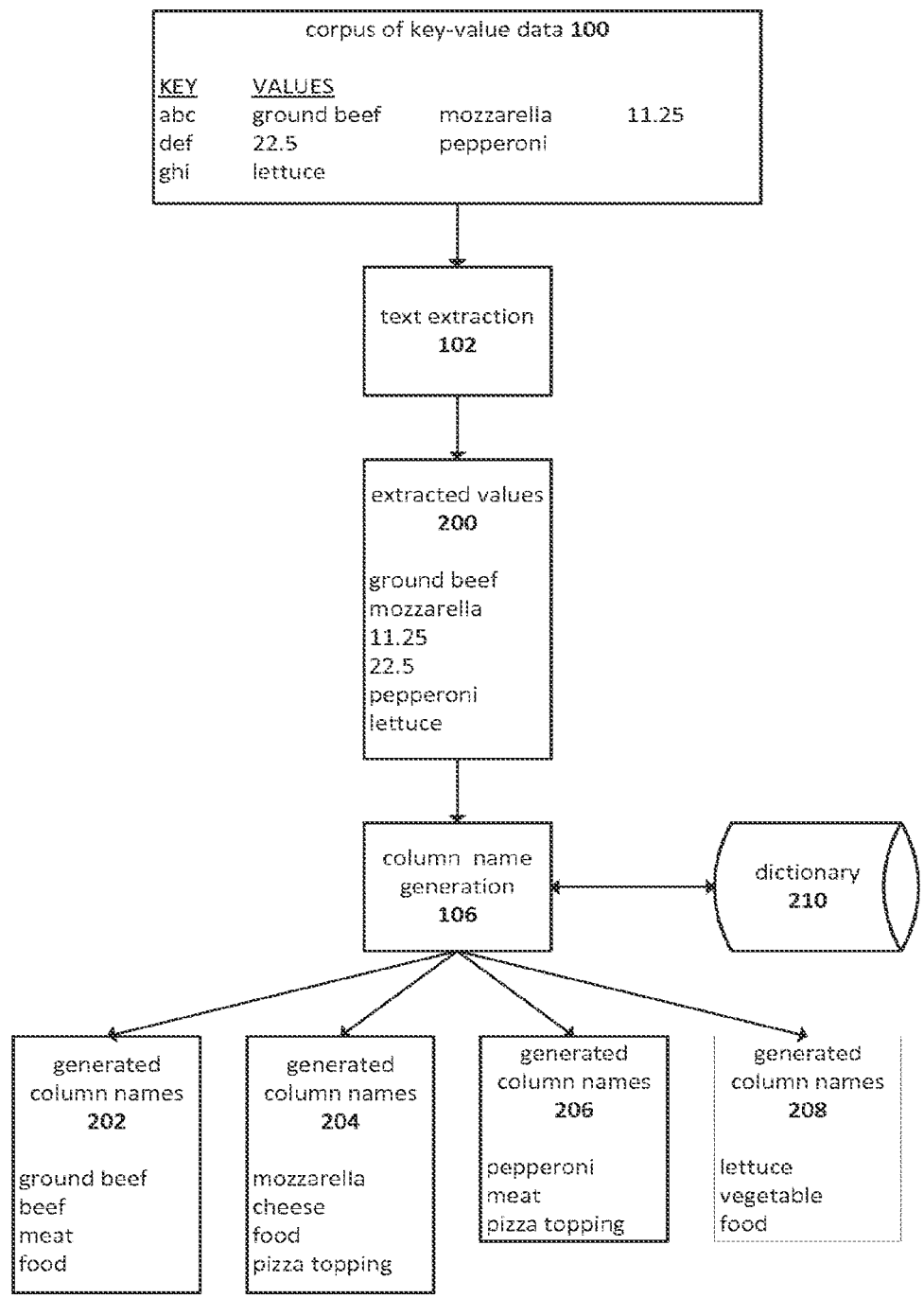
FIG. 2 depicts an embodiment for extracting textual values from a corpus of key-value data and generating a set of potential column names from the extracted textual values.

An embodiment of a process for potential column name generation 106 is depicted with greater detail in FIG. 2. Corpus of key-value data 100 resides in a database management system or other repository capable of storing data via key-value association. Text extraction 102 produces a list of extracted values 200. In some embodiments, the text values may be copied into a separate data structure. Other embodiments may form a data structure containing links or other references to the location of the data within the store.

The extracted values 200 may serve as input to potential column name generation 106. Each value may be converted to a list of generated column names, 202, 204, 206 and 208. The generation may be performed with reference to dictionary 210. For example, the value "mozzarella" in extracted values 200 may result, via column name generation 106, in generated column names 204, which are depicted as including "mozzarella," "cheese," "food" and "pizza topping."

Referring back to FIG. 1, column assignment 108 involves assigning or associating the extracted values with potential column names. Various approaches may be employed to perform the initial assignment. One example is an identity function that maps a text value to one or more of the column names generated from the text value. Another possibility involves assigning values to column names based on a random weighting of all of the potential column names created based on the value. Other possibilities include non-uniform weighting based on initial probabilities recorded in a dictionary or otherwise derived from a semantic analysis of the value. In some embodiments, the solution constraints extracted at 104 may be factored into the initial assignment, such that a strong negative constraint between two values decreases the likelihood that they will be assigned to the same column. Similarly, a constraint indicating a high likelihood of semantic similarity could increase the likelihood that two values would initially be assigned to the same column name. In various embodiments, some or even most of the column names may not be associated with extracted text values.

In various embodiments, the assignment of potential column names may be made based on at least one of two axes of probability. First, there is a probability of semantic relationship between the value and the potential column name. Second, there is a probability of semantic relationship between the value and another value.

Fit quality analysis 114 influences refinement of the partial column schema subsequent to the initial assignment of values to column names. In general, fit quality may be assessed by two factors. First, fit quality may be assessed based on semantic similarity, which may be assessed both between values assigned to the same potential column name and between a value and the potential column name assigned to it. Second, fit quality may be assessed based on a utilization quality. This may be calculated based on the number of values assigned to a potential column name. In addition, the utilization quality may be computed as a ratio between the current utilization and a summation involving prospective fit qualities. These may be computed based on hypothetical assignment of values to different potential column names.

For each value, a semantic fit quality may be determined based on the semantic similarity between the value, its assigned column name and other values assigned to the same column name. Fit quality may also be determined based on semantic dissimilarity between the value, column names not assigned to it, and values assigned to other column names. In an embodiment, a directed acyclic graph representing an ontology may be employed, for example by calculating fit quality as a linear combination of the inverse distance in the graph to each related word and the distance to each unrelated word.

For each column name, a utilization quality for the column may be calculated based on the number of values assigned to the column. The utilization quality may further involve the ability of the column name to associate its assigned values better than other column names. For example, a ratio may be computed based on a value's semantic fit quality for its current column compared to the semantic fit qualities that would result from placing the same value into other columns. The column's utilization quality may then be computed as a function of the ratios for each value assigned to the column. In an embodiment, a column name's utilization quality may be compared to a prospective utilization quality based on prospective assignment of values to other column names. In a further embodiment, a count of the number of values currently associated with a column may be compared to the number of values that could be assigned to a second column using a different semantic grouping.

Iterative generation 116 involves the generation and evaluation of a new partial column schema based on the previous partial column schema. In the depicted embodiment, value shuffling 110 comprises reassigning values to columns. Column pruning 112 involves the elimination of column names and the reassignment of any associated values. Fit quality analysis 114 may act to influence value shuffling 110 and column pruning 112. Iterative generation 116 may also be affected by a system temperature that may be reduced in successive generations. The system temperature may act to limit random factors, which may influence column assignment 108, value shuffling 110, column pruning 112 and other operations. As the system temperature is reduced, the degree of randomness in the system is reduced, which may aid the iteration in converging on a reasonably accurate partial column schema.

Value shuffling 110 may be performed by selecting a value for reassignment based in part on its semantic fit quality and a random exploration factor. For example, a value may be selected for reassignment based on a value computed as fit quality adjusted by a random exploration factor. If this value is smaller than other similarly computed values, it may be selected for reassignment. In an embodiment, the random exploration factor is subtracted from the fit quality. The random exploration factor may be modified by a system temperature.

Figure 3:
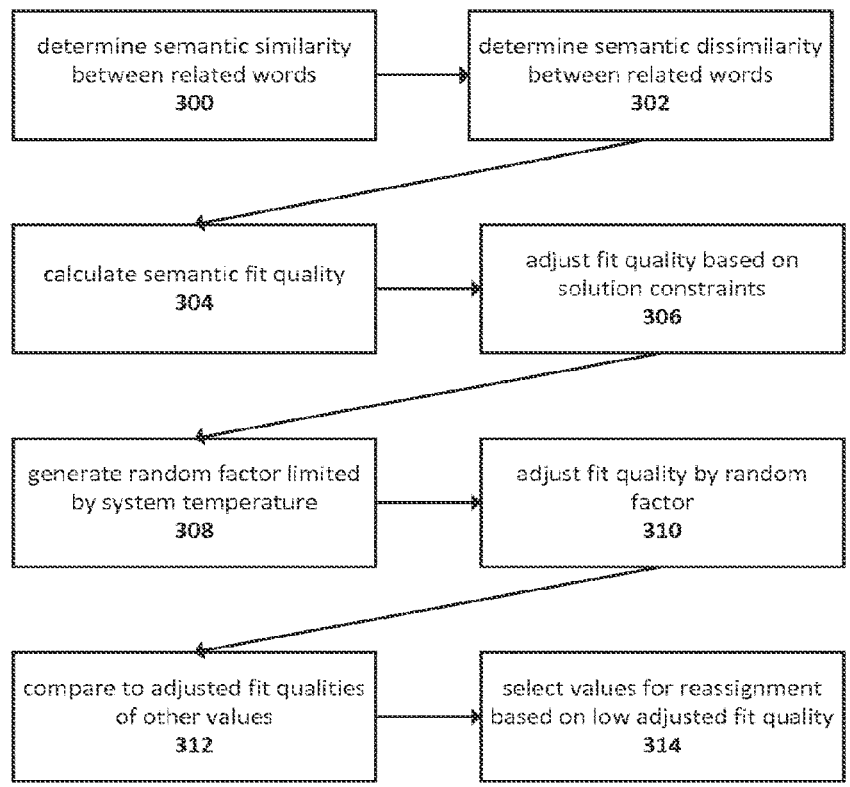
FIG. 3 depicts an embodiment of performing fit quality analysis and performing column shuffling by selecting value for reassignment.

FIG. 3 depicts an embodiment of performing fit quality analysis and selecting a value for reassignment. Operation 300 involves determining the semantic similarity between a value being considered for shuffling and related words. In this context, related words may include other values associated with the same potential column name, as well as the potential column name itself. Operation 302 is analogous, involving a determination of semantically dissimilar words. One or both of these values may be utilized in calculating an overall semantic fit quality for the value in its current position, as depicted in operation 304. Semantic similarity increases the measure of fit quality, while semantic dissimilarity reduces the measure of fit quality.

Operation 306 depicts adjusting the semantic fit quality based on extracted constraints. This may be done, for example, by normalizing constraint strength to a defined range and multiplying the measure of fit quality by the normalized strength value for each applicable constraint. In general, negative constraints act to reduce the assessed fit quality while positive constraints act to increase it. In an embodiment, negative constraints may be indicated between values associated with a common key, and strengthened based on repetition of association with a common key. Positive constraints may be indicated by lack of association with a common key.

In an embodiment, positive and negative constraints may also be supplied by a user via user interface, Web service and so forth. In other embodiments, a predefined set of constraints may be applied. The constraints may be based, for example, on previously generated partial column schemas. Predefined constraints may be used instead of or in addition to constraints extracted from the corpus of key-value data.

Operations 308 and 310 depict generating a random exploration factor limited by a system temperature and using the random factor to adjust the value's semantic fit quality. A system temperature may act to limit the random exploration factors. In an embodiment, a system temperature is maintained and adjusted downward subsequent to each generation of a partial column schema. The system temperature may, for example, set an upper limit on the value of the random exploration factors used in value shuffling 110, column pruning 112 and so forth. The system temperature thus acts to limit the degree of randomness seen in each subsequent generation of partial column schemas.

Operations 312 and 314 depict comparing the adjusted fit qualities for each value associated with a column name and selecting a value for reassignment based on a low adjusted fit quality, which may include adjustments based on a random exploration factor and limited by the system temperature. In an embodiment, the value with the lowest adjusted fit quality is selected for value shuffling. Other embodiments might, for example, select all values falling below a certain threshold. It may be desirable to skip value shuffling for a particular column name if none of the adjusted fit qualities fall beneath a threshold, or alternatively if all adjusted fit qualities are above a threshold value.

In addition to the aforementioned use of system temperature, various other methods may be employed to randomize evolution between generations of partial column schemas. A value could be selected for shuffling at random, and the frequency of such selection could be controlled by the system temperature. In an embodiment, the use of a system temperature may be omitted and replaced by an alternative method of controlling the number of iterations, such as a determination that fit quality is above a threshold level, or that a maximum number of iterations has occurred.

In performing value shuffling 110, various approaches may be used to select a new column name. In one embodiment, column labels may be arranged into a directed acyclic graph. The graph may for example be traversed from a root location to the new column name. At each branch, a selection may be made between the branches based on a function of utilization qualities of columns along the branch and a randomization factor adjusted by the system temperature. In this manner, the path containing column names with higher utilization is more likely to be chosen than the path with lower utilization. In an embodiment, the graph is weighted with solution constraints calculated based on associations between a value represented in the graph and other values sharing a common key with the value.

Figure 4:
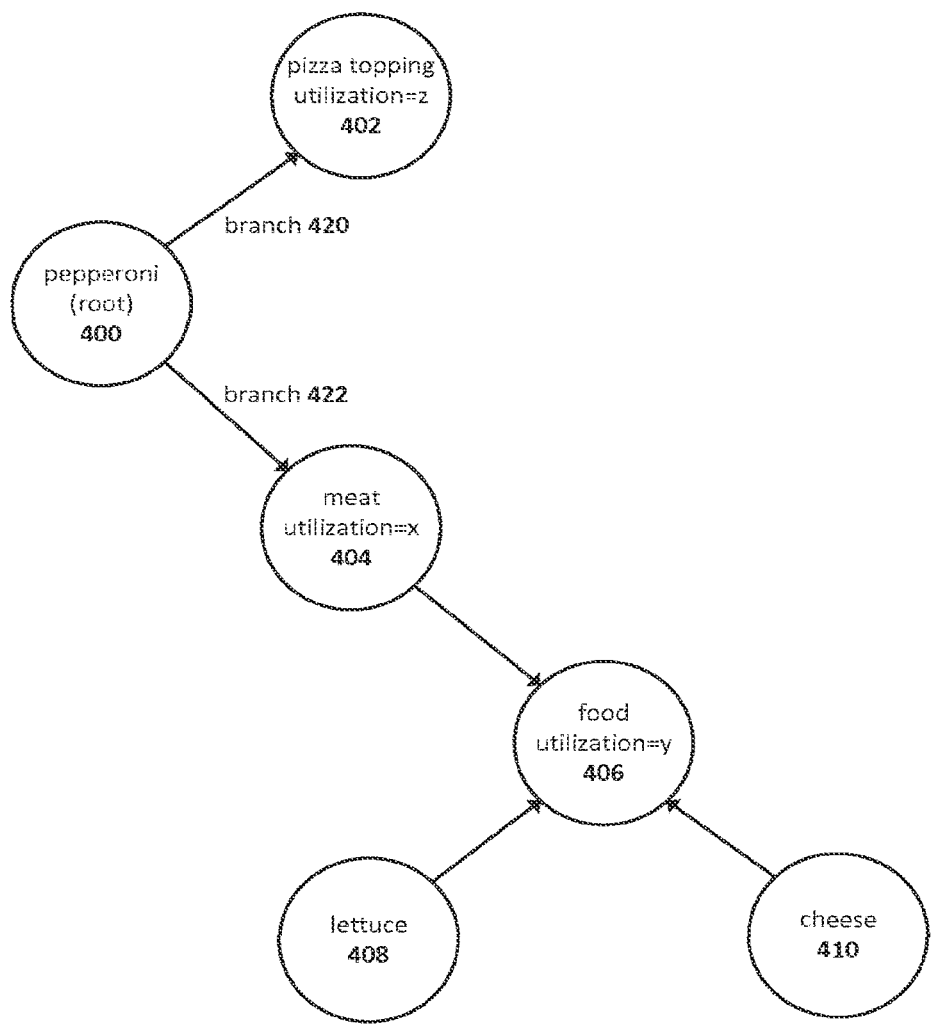
FIG. 4 depicts an embodiment of selecting a new potential column name by graph traversal.

FIG. 4 depicts an embodiment of selecting a new potential column name for reassignment. Node 400 represents the root of a graph structure indicative of a potential column name currently associated with a value. Branches 420 and 422 extend from root node 400. A new potential column name may be selected by traversing a branch chosen based on a function of the utilization qualities associated with node 402 on the one hand and nodes 404 and 406 on the other. For example, the sum of utilization qualities associated with nodes 404 and 406 might be compared with the utilization quality associated with node 402. In some embodiments the result of the computation might further be modified by a random factor, the random factor possibly limited by a system temperature. The modified utilization qualities for each branch may then be compared, and the branch selected based on probabilistic weighting of the modified utilization qualities traversed to select the new potential column name. The value may then be reassigned, or shuffled, to the new potential column name. Nodes 408 and 410 represent possible root nodes usable by other potential column names.

Returning to FIG. 1, column pruning 112 may be performed by selecting a potential column name for elimination from the partial column schema. In an embodiment, the potential column name may be selected based in part on its utilization quality and a random exploration factor, which may be limited by a system temperature. In an embodiment, the random exploration factor is subtracted from the utilization quality for the potential column name. The column having the smallest such value is selected for pruning. A pruned potential column name is eliminated from the partial column schema and values can no longer be assigned to it. In various embodiments, when a potential column name is selected for pruning the values currently assigned to it may be reassigned as if they had been selected for value shuffling.

Figure 5:
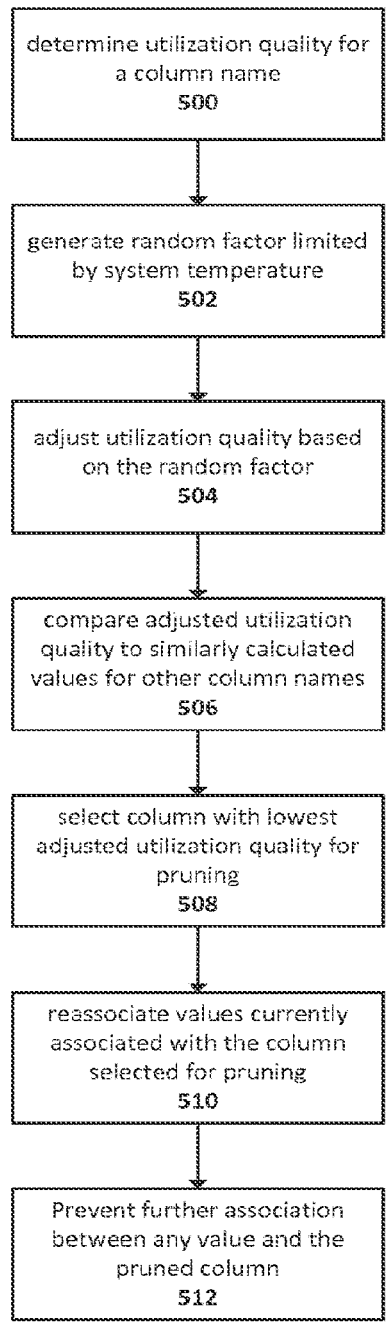
FIG. 5 depicts an embodiment for column pruning by selecting and removing a potential column name from the partial column schema.

FIG. 5 depicts an embodiment for selecting and removing a column name from the partial column schema. At operation 500, a utilization quality for a column name is determined. Various algorithms or formulas may be employed to calculate the utilization quality, provided that the resulting metric is indicative of how well the column name is or could be utilized by values in the corpus of key-value data. In an embodiment, the utilization quality is indicative of semantic fit qualities for one or more values assigned to a potential column name. A ratio may be calculated using the semantic fit quality of a value currently associated with the column and prospective semantic fit qualities for the value, calculated as if the value were associated with other potential column names.

At operations 502 and 504, the utilization quality is adjusted based on a random factor limited by a system temperature. The random factor may, for example, be subtracted from the calculated utilization quality to arrive at an adjusted utilization quality. The range of the random factor may be limited by a system temperature. Over multiple iterations, as the system temperature is reduced the degree of randomness in the utilization quality is also reduced.

Operations 506 and 508 depict comparing the adjusted utilization quality for the column name with those calculated similarly for other column names. In the depicted embodiment, the column name with the lowest adjusted utilization quality may be selected for pruning. In some embodiments, it may be desirable for all column names with utilization qualities above a threshold value to be retained.

Once a column is selected for pruning, all values currently associated with the column must be reassigned to other potential column names. One approach for doing so, among many, is to treat each value currently assigned to the pruning target as if the value had been selected for shuffling. This is depicted by operation 510. Furthermore, the column name selected for pruning may be prevented from further association with any value, as depicted by operation 512. This may, for example, be accomplished by deleting records or data structures pertaining to the column name from the partial column schema. In some embodiments, the applicable records or data structures may be simply marked as inaccessible, marked for deletion and so forth.

Returning to FIG. 1, iterative generation 116 involves repeating the operations described above to explore the fitness of successive generations of partial column schemas. Various means may be employed to determine when the iteration should be terminated. For example, iteration may be halted when successive generations of partial column schemas are identical, the fit quality of successive generations is not improved, system temperature has fallen below a threshold value and so forth.

Figure 6:
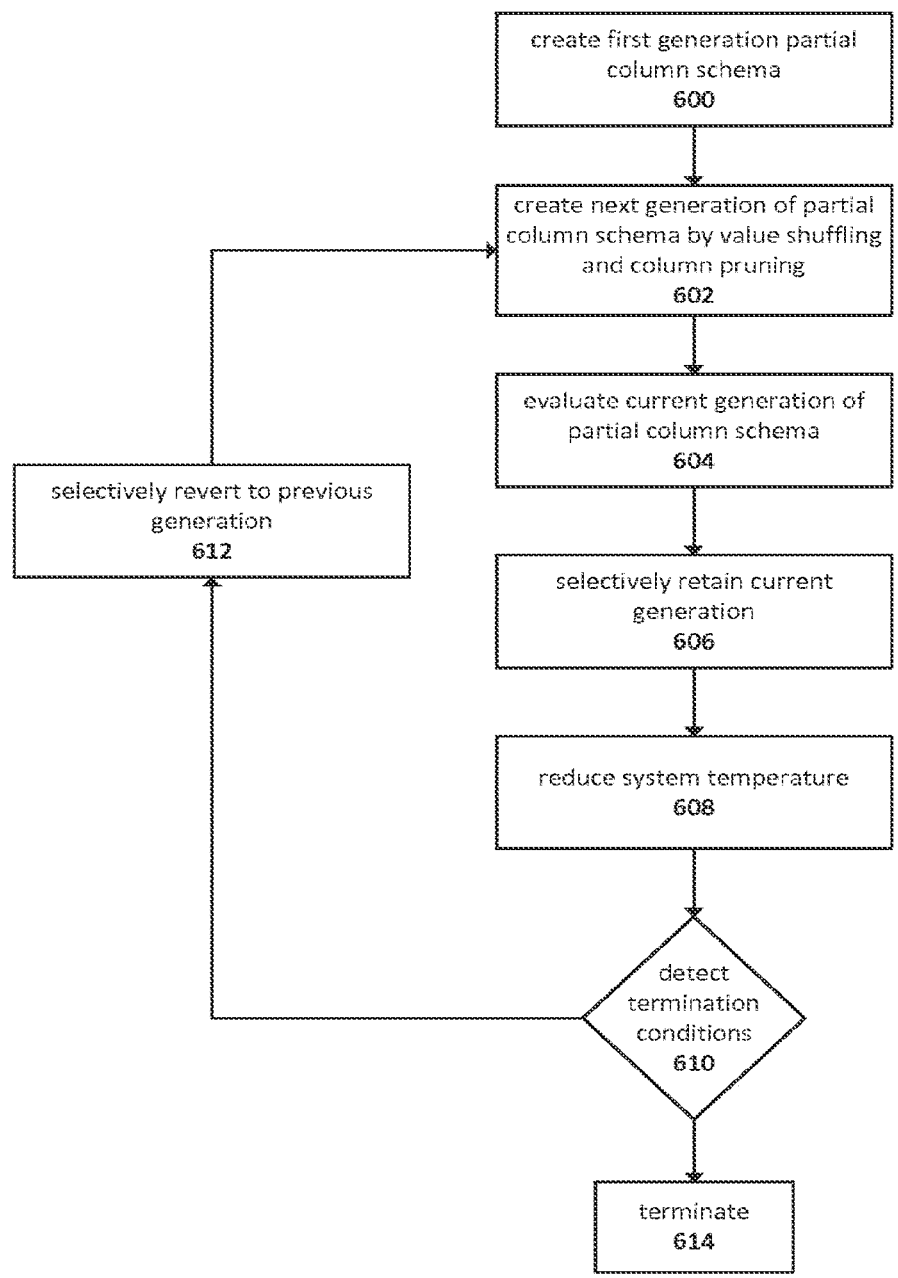
FIG. 6 depicts iteration and exploration of partial column schemas based on random exploration and reduction of system temperature.

An example of iterative generation is seen in FIG. 6, which depicts an embodiment involving successive generations of partial column schemas, some of which are retained for further exploration in later iterations. At operation 600, an initial partial column schema is created. The initial schema may also be evaluated for semantic and utilization quality. At 602, subsequent generations of partial column schemas are created through the value shuffling and column pruning operations described herein. The subsequent generations may be evaluated for semantic and utilization quality, depicted as operation 604. Based on the evaluation, at 606 some generations are selectively retained for future evaluation. This may be done, for example, by retaining partial column schemas whose overall fitness is above a threshold level, possibly modified by a random factor limited by the system temperature. Towards the end of an iteration, the system temperature may be reduced as depicted in 608.

Fit exploration may terminate based on a detection of termination conditions at operation 610. These conditions may include, for example, convergence on a particular solution by previous generation, fit quality above a threshold, lack of improvement between successive generations and so forth. At 614, if the termination conditions are met the iteration is stopped and either the current or one of the retained generations is selected. Alternatively, a set of partial column schemas may be selected for later use or evaluation.

If the termination condition is not met, the operations beginning at 602 may be repeated. In some embodiments, prior to re-executing operation 602, operation 612 may act to revert to a previous generation of partial column schema, such that operation 602 performs value shuffling and column pruning on that previous generation. The reversion may occur, for example, in response to factors such as fit quality in the current generation falling below a threshold value. Some embodiments may revert several times at each generation to perform an essentially breadth-first search of potential partial column schemas. Other embodiments may prefer a depth-first search, in which reversion to a previous generation of partial column schema occurs only after modification to the current generation has been explored.

As the iteration continues, partial column schemas having sufficient quality, as judged by semantic fit quality and utilization qualities, may be retained for use. In an embodiment, partial column schemas are retained if their semantic fit qualities and utilization qualities are above a threshold level.

Based on one or more retained partial column schemas, various operations may be performed on the corpus of key-value data maintained on a database management system, such that the operations benefit from being performed on semantically related data. For example, non-traditional databases may have various secondary indexes mapping from values other than the main (i.e. primary) key value. In an embodiment, a secondary index may be constructed over semantically related values assigned to a common potential column name. The index may be referenced based on, for example, semantic similarity between an incoming query value and the potential column name.

In another embodiment, various summarization operations may be performed using a partial column schema. Because semantically related data is grouped with an associated potential column name, reasonable approximations of various types of operations such as pivoting, summation, group by operations and so forth may be performed by performing the operation on values associated with a common potential column name. For example, a secondary index created on values associated with a potential column name may be scanned and summarized with a group by operation returning a count of each distinct value associated with that column.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more storage devices comprising one or more database files configured to maintain a set of items comprising a key and one or more values associated with the key; and
   one or more memories having stored thereon computer-readable instructions that upon execution cause the system at least to:

extract a set of values from the set of items;
generate a set of column names from the set of values;
assign a plurality of values from the set of items to a plurality of column names in the set of column names;
recursively reassign a first value to other column names in the plurality of column names based at least in part on a semantic fit quality and a utilization quality;
wherein the semantic fit quality is based at least in part on a solution constraint and semantic similarity of the first value to a column name to which the first value is assigned and the other values in the plurality of values assigned to the column name, the solution constraint based at least in part on the first value sharing a common key with a value from the set of items; and
wherein the utilization quality is based at least in part on a number of values currently assigned to the column name to which the first value is assigned and a comparison of the semantic fit quality to a prospective semantic fit quality.

2. The system of claim 1, the one or more memories having further stored thereon computer-readable instructions that upon execution cause the system at least to:
assign all values currently associated with the column name to which the first value is assigned to a different column name.

3. The system of claim 1, further comprising reducing a system temperature, wherein a random factor limited by the system temperature modifies one or more of the semantic fit quality and the utilization quality.

4. The system of claim 1, wherein the semantic fit quality is calculated based at least in part on a distance between related words in an ontology graph.

5. A non-transitory computer-readable storage medium having stored thereon instructions that, upon execution by a computing device, cause the computing device at least to:
construct a first association between a first value extracted from a set of items and a first column name selected from a set of textual values that are ontologically related to one or more values in the set of items, the set of items comprising a key and one or more values associated with the key;
select the first value for association with a different column name based at least in part on a semantic fit quality for the first value; and
construct a second association between the first value and a second column name, the second column name selected by traversing a graph representative of ontological relationships between the first column name and one or more additional column names.

6. The non-transitory computer-readable storage medium of claim 5, wherein the set of textual values is generated using a dictionary of ontologically related values.

7. The non-transitory computer-readable storage medium of claim 5, wherein the traversing the graph is based at least in part on a utilization quality for the first column name.

8. The non-transitory computer-readable storage medium of claim 5, wherein the set of textual values comprises one or more of a synonym, antonym, or collective noun.

9. The non-transitory computer-readable storage medium of claim 5, having stored thereon instructions that, when executed by a computing device, cause the computing device to at least:
select the first value for association with the different column name based at least in part on a first random factor.

10. The non-transitory computer-readable storage medium of claim 9, having stored thereon instructions that, when executed by a computing device, cause the computing device to at least:
reduce a first system temperature, wherein the first system temperature limits the first random factor.

11. The non-transitory computer-readable storage medium of claim 5, having stored thereon instructions that, when executed by a computing device, cause the computing device to at least:
compute the semantic fit quality for the first value based at least in part on a solution constraint, the solution constraint indicative of the first value sharing a common key with another value in the set of items.

12. The non-transitory computer-readable storage medium of claim 5, having stored thereon instructions that, when executed by a computing device, cause the computing device to at least:
determine the semantic fit quality for the first value based at least in part on semantic similarity with a related value and semantic dissimilarity with an unrelated value, the related value associated with the first column name.

13. The non-transitory computer-readable storage medium of claim 5, having stored thereon instructions that, when executed by a computing device, cause the computing device to at least:
select the first column name for pruning, the selection based on a utilization quality and a second random factor, wherein pruning comprises removing all associations between the first column name and values extracted from the set of items.

14. The non-transitory computer-readable storage medium of claim 13, wherein the utilization quality is based at least in part on a comparison of prospective semantic fit qualities.

15. The non-transitory computer-readable storage medium of claim 5, wherein an initial association between the first value and the first column name is based on an identity function mapping the first value to a column name.

16. A method for grouping semantically related data stored in a database management system, the method comprising:
constructing a first association between a first value extracted from a set of items and a first column name selected from a set of textual values that are ontologically related to at least one value from the set of items, the set of items comprising a key and one or more values associated with the key;
selecting the first value for association with a different column name based at least in part on a semantic fit quality for the first value;
constructing a second association between the first value and a second column name selected by traversing a graph representative of ontological relationships between the second column name and one or more additional column names; and
determining that a utilization quality for the first column name is less than a utilization quality corresponding to the second column name.

17. The method of claim 16, wherein the traversing the graph comprises a directed random walk based at least in part on edge weightings.

18. The method of claim 16, further comprising reducing a system temperature, the system temperature influencing a degree of randomness.

19. The method of claim 16, wherein the utilization quality is based at least in part on a comparison of the semantic fit quality to a prospective semantic fit quality.

20. The method of claim 16, further comprising extracting the first value from the database management system and extracting one or more ontologically related values from a dictionary.

21. The method of claim 16, wherein traversing a graph is based at least in part on the utilization quality for the second column name.

22. The method of claim 16, further comprising:
calculating the semantic fit quality for the first value based on semantic similarity with a related value and semantic dissimilarity with an unrelated value, the related value associated with the second column name.

23. The method of claim 16, wherein a solution constraint is used to adjust one or more of the semantic fit quality, the utilization quality, and a branch of the ontological graph, the solution constraint calculated for a value based on associations between the value and other values sharing a common key with the first value.

24. A system comprising:
one or more storage devices comprising one or more database files configured to maintain a set of items comprising a key and one or more values associated with the key; and
one or more memories having stored thereon computer-readable instructions that upon execution cause the system at least to:
assign a first value corresponding to a value in the set of items to a first column name from a set of column names;
select the first value for reassignment, the selection based at least in part on a first degree of semantic similarity between the first value and other values currently assigned to the first column name;
determine a second degree of semantic similarity between the first value and other values currently assigned to a second column name; and
assign the first value to the second column name, the second column name selected for assignment based at least in part on the second degree of semantic similarity.

25. The system of claim 24, wherein the set of column names is generated based on semantic similarity with values in the set of items.

26. The system of claim 24, wherein the selection of the first value for reassignment is based at least in part on the first value sharing a common key with a value in the set of items.

27. The system of claim 24, wherein the selection of the first value for reassignment is based at least part on comparing the first degree of semantic similarity to a prospective degree of semantic similarity associated with prospectively assigning the first value to the second column name.

28. The system of claim 24, wherein a record of the assignment of the value to the first column name is retained for further evaluation.

* * * * *